F. F. ENTER.
WHEEL RIM FASTENING DEVICE.
APPLICATION FILED MAY 3, 1920.
1,379,856.
Patented May 31, 1921.
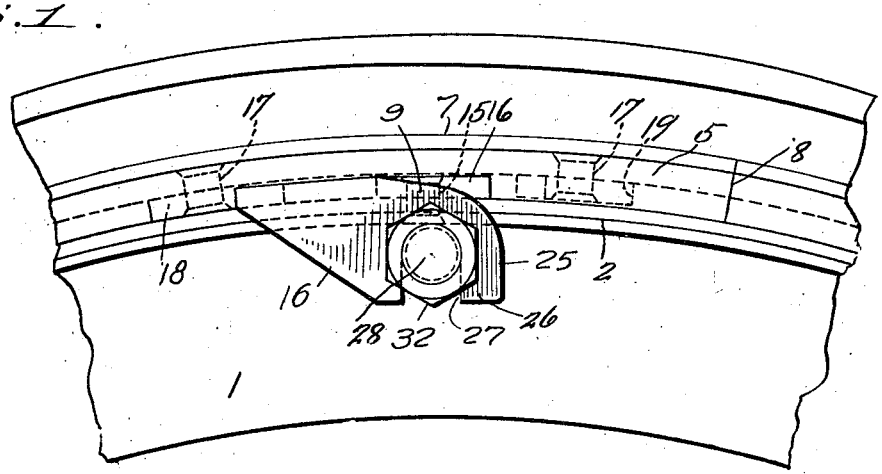
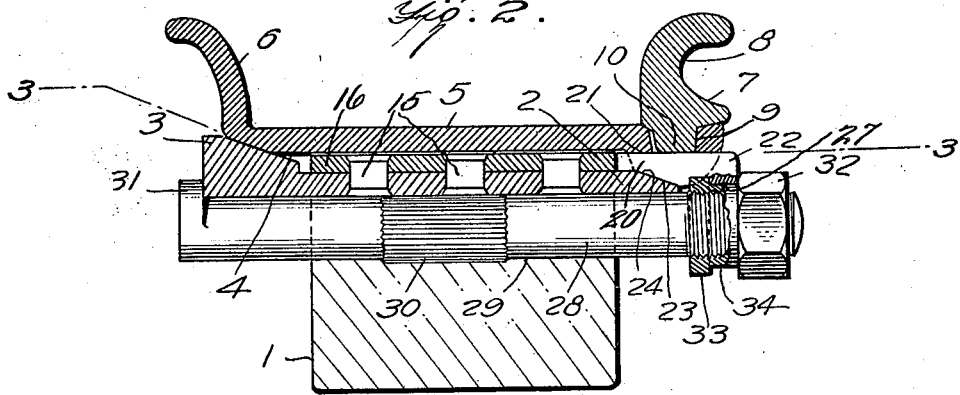
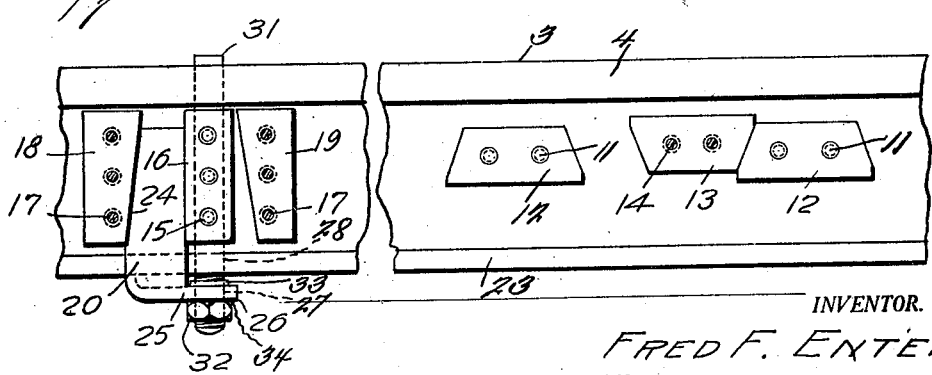
INVENTOR.
FRED F. ENTER,
BY
ATTORNEY.

UNITED STATES PATENT OFFICE.

FRED F. ENTER, OF CUYAHOGA FALLS, OHIO, ASSIGNOR OF ONE-HALF TO WILLIAM MARTIN, OF CLEVELAND, OHIO.

WHEEL-RIM-FASTENING DEVICE.

1,379,856.                Specification of Letters Patent.        Patented May 31, 1921.

Application filed May 3, 1920. Serial No. 378,524.

*To all whom it may concern:*

Be it known that I, FRED F. ENTER, a citizen of the United States, residing at Cuyahoga Falls, in the county of Summit and State of Ohio, have invented certain new and useful Improvements in Wheel-Rim-Fastening Devices, of which the following is a specification, reference being had to the accompanying drawings.

This invention relates to an improved wheel rim fastening device and an object is to provide a construction which is very simple, efficient and practical and includes wedge connections between the felly band and the rim, and means for causing wedging or binding actions radially as well as in the direction of rotation of the wheel for fastening or binding the rim on the felly band of the wheel.

Another object consists in the provision of a construction which can be very cheaply made and sold at a reasonable profit.

Still another object embodies means for holding a transverse member relatively to the felly of the wheel as such member includes means coöperating with the wedging and binding parts to hold the rim in position.

While the design and construction at present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:—

Figure 1 is a side view of a portion or section of the felly of a wheel, showing the detachable rim flange of the rim and illustrating the means for holding the rim on the felly.

Fig. 2 is a transverse sectional view; and

Fig. 3 is a sectional plan view on line 3—3 of Fig. 2 showing the rim as removed owing to sectioning across the rivets which secure wedge plates to the rim, and also illustrating the attachment plates of the rim and the felly band to prevent the rim from creeping.

Referring to the drawings, 1 designates a conventional form of wheel felly, which may be constructed of any suitable material, preferably wood, and mounted thereon in surrounding relation is a felly band 2. The inner side of the felly band is radially enlarged as shown at 3, and is provided with a bevel 4. In surrounding relation to the felly band is a wheel rim 5, the inner side of which is provided with an integral tire retaining flange 6, while the outer side is provided with the usual demountable tire retaining flange 7. This flange 7 is in the form of a ring and is split as shown at 8 at any suitable location so as to be sprung into engagement with the rim. The outer side of the rim 5 is constructed as shown in order to make provision for an annular channel 9, which receives the reduced part 10 of the demountable ring flange 7. Secured by rivets or the like 11 to the felly band and at any suitable locations thereon are traction wedge plates 12 which coöperate with the traction wedge plates 13 which are riveted or otherwise secured at 14 to the inner cylindrical surface of the rim 5. In other words, by means of these traction wedge plates coöperating with each other, enables means to be afforded to prevent excessive creeping of the rim relatively to the felly band incident to the rotation of the wheel.

Also riveted or otherwise secured at 15 to the felly band is an abutment plate 16. Secured by rivets or the like 17 to the inner cylindrical surface of the rim are locking wedge plates 18 and 19, one or the other of which coöperates with the plate 16 assisting materially in holding the rim in order to not only keep it from creeping in the direction of rotation of the wheel, but also acting to prevent lateral movement as well. However, the rim 5 does not depend entirely upon the coöperative wedging actions between the wedge 20 and the wedging plates 16 and 18 or 16 and 19, it depending on the side of the vehicle on which the wheel is operating.

The part of the rim 5 which has the channel 9 has its under part provided with a recess 21, for the reception of the enlarged end 22 of the wedge 20. The outer cylindrical surface of the felly band adjacent the outer side of the band is provided with a bevel 23 with which the beveled surface 24 of the enlarged end 22 of the wedge 20 coöperates particularly when the wedge 20 is moved laterally of the felly band so as to force the enlarged end 22 radially outwardly. When the wedge 20 is forced radially outwardly it binds upon the rim 5, and not only holds the rim against movement laterally, but also assists materially in preventing creeping of the rim. Also the more the rim is forced radially outwardly, the tighter it fits and the more the rim is forced in a direction of the bevel 4 of the felly band and owing to the wedge plate 18 being carried by the rim, the firmer the rim is held against lateral movement. In other words, the more the wedge 20 is moved laterally the more the rim is moved toward the bevel 4 owing to the inclined edge 24 of the wedge 20 coacting with a similar edge of one of the wedge plates 18 and 19 which will cause the rim to move toward the bevel 4 and bind thereon. The wedge 20 has a lateral arm 25 provided with a down-turned portion 26 which down-turned portion has a U-shaped recess 27. The felly of the wheel has mounted therein transversely thereof a cylindrical locking rod 28, which is engaged in the recess 29 of the felly. The locking bolt or rod 28 substantially midway of its ends is provided with longitudinally extending ribs or raised portions or teeth 30. Preferably these teeth are V-shaped as shown and act to embed in the wood of the felly, thereby preventing the rod or bolt 28 from turning. The end of the rod or bolt 28 adjacent the inner side of the wheel has a radially turned lug 31, which engages the inner side of the felly band, hence preventing movement of the felly band laterally toward the inner side of the wheel. Owing to the wedge 20 being forced in the direction of the inner side of the wheel, and owing to the rim 5 being forced toward and in engagement with the bevel 4, the rim 5 is held securely in position.

The rod or bolt 28 adjacent the outer side of the wheel has its extremity threaded as shown and engaging said threaded end is a nut 32. This nut 32 has an extension sleeve 33 which is provided with an annular groove 34 which receives the U-shaped arch or recess 27 of the radially turned portion 26 of the wedge 20. In other words, the nut 32 has a swivel connection with the radially turned end of the wedge 20 so that by moving the nut in one direction or the other, the wedge 20 may be moved in directions toward the inner side or the outer side of the wheel. As previously stated the more the wedge 20 is moved toward the inner side of the wheel, the tighter the rim may be secured. Upon unscrewing the nut 32 the wedge 20 may be withdrawn, and the rim may be very easily and quickly detached.

The invention having been set forth, what is claimed as new and useful is:—

1. In a wheel rim fastening device, the combination with a wheel felly, a felly band mounted thereon, a rim in surrounding relation to the felly band, the inner side of the felly band having a beveled abutment flange, the adjacent faces of the felly band and the rim having spaced wedge plates, a wedge engaging between said wedge plates for forcing the rim toward the beveled flange thereby securing the rim in position, means for adjusting and holding the wedge in place, and means for causing an outward radial action of one end of the wedge to prevent lateral movement of the rim toward the outer side of the wheel.

2. In a wheel rim fastening device, a felly, a rod arranged transversely thereof having means to prevent movement, a felly band in surrounding relation to the felly, means at one end of the rod to be engaged by the felly band to prevent movement thereof, a rim in surrounding relation to the felly band and provided with a wedging abutment adjacent one side of the rim to prevent movement of the rim in one direction, wedging members carried respectively upon the adjacent faces of the felly band and the rim, a wedge engaging between said wedging member and means adjustable on one end of the rod and provided with a swivel connection with said wedge for moving it in a lateral direction and forcing the rim radially, said wedge and the felly band having coöperating beveled parts to spread the rim relatively outwardly and radially from the felly band, thereby causing the wedging parts to coöperate and to retain the rim in position.

In testimony whereof I hereunto affix my signature.

FRED F. ENTER.